(12) United States Patent
Carmel-Veilleux et al.

(10) Patent No.: US 9,161,170 B2
(45) Date of Patent: Oct. 13, 2015

(54) SYSTEM AND METHOD FOR DETERMINING A MAGNETIC FIELD USING A MOBILE DEVICE

(75) Inventors: Tennessee Carmel-Veilleux, Kitchener (CA); Robert George Oliver, Waterloo (CA); Nathan Daniel Pozniak Buchanan, Waterloo (CA); Nazih Almalki, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 284 days.

(21) Appl. No.: 13/481,616

(22) Filed: May 25, 2012

(65) Prior Publication Data

US 2013/0316736 A1    Nov. 28, 2013

(51) Int. Cl.
   *H04W 4/02*   (2009.01)
(52) U.S. Cl.
   CPC ..................................... *H04W 4/026* (2013.01)
(58) Field of Classification Search
   CPC .................................. G08B 7/06; H04W 4/026
   USPC ............ 455/456.1, 456.3; 324/251, 202, 200; 701/408, 530
   See application file for complete search history.

(56) References Cited

U.S. PATENT DOCUMENTS

| | | | |
|---|---|---|---|
| 6,836,971 B1 | 1/2005 | Wan | |
| 7,684,904 B2 | 3/2010 | Wainwright et al. | |
| 8,243,961 B1* | 8/2012 | Morrill | 381/123 |
| 9,030,192 B2* | 5/2015 | Oliver et al. | 324/202 |
| 2005/0240347 A1 | 10/2005 | Yang | |
| 2005/0246099 A1* | 11/2005 | Jendbro et al. | 701/216 |
| 2008/0042973 A1 | 2/2008 | Zhao et al. | |
| 2009/0184849 A1 | 7/2009 | Nasiri et al. | |
| 2010/0045269 A1* | 2/2010 | LaFranchise et al. | 324/207.11 |
| 2010/0312509 A1 | 12/2010 | Patel et al. | |
| 2010/0312510 A1 | 12/2010 | Piemonte et al. | |

(Continued)

FOREIGN PATENT DOCUMENTS

| | | |
|---|---|---|
| EP | 0268278 B1 | 1/1993 |
| JP | H2-10111 | 1/1990 |

(Continued)

OTHER PUBLICATIONS

Paller, Gabor, Measuring movement with accelerometer and gyroscope, http://www.sfonge.com/forum/topic/measuring-movement-accelerometer-and-gyroscope, available on the Internet as early as Jan. 20, 2012, retrieved from the Internet Apr. 2, 2012.

(Continued)

*Primary Examiner* — Inder Mehra
(74) *Attorney, Agent, or Firm* — Jose Gutman; Fleit Gibbons Gutman Bongini & Bianco P.L.

(57) ABSTRACT

A method and system are provided for determining a magnetic field using a mobile device. The method includes determining location information of the mobile device, obtaining magnetic field data based on the location information, determining orientation information of the mobile device and applying the orientation information to the magnetic field data to compute a magnetic field corresponding to the orientation of the mobile device.

20 Claims, 7 Drawing Sheets

(56) References Cited

U.S. PATENT DOCUMENTS

| | | | |
|---|---|---|---|
| 2011/0063167 A1* | 3/2011 | Gum et al. | 342/357.65 |
| 2012/0015730 A1* | 1/2012 | Watkins et al. | 463/36 |
| 2012/0062223 A1 | 3/2012 | Olsson et al. | |
| 2012/0071151 A1* | 3/2012 | Abramson et al. | 455/418 |
| 2012/0098525 A1 | 4/2012 | Snow et al. | |
| 2012/0157158 A1* | 6/2012 | Mayor et al. | 455/556.1 |
| 2012/0185204 A1* | 7/2012 | Jallon et al. | 702/141 |

FOREIGN PATENT DOCUMENTS

| | | |
|---|---|---|
| WO | 2005106391 A1 | 11/2005 |
| WO | 2011123149 A1 | 10/2011 |

OTHER PUBLICATIONS

Paller, Gabor, Compensating accelerometer data with the gyroscope, http://www.sfonge.com/forum/topic/compensating-accelerometer-data-gyroscope, available on the Internet as early as Jan. 25, 2012, retrieved from the Internet Apr. 3, 2012.

Gadget Gangster, Accelerometer & Gyro Tutorial, http://www.instructables.com/id/accelerometer-gyro-tutorial/, available on the Internet as early as Jan. 21, 2010, retrieved from the Internet May 24, 2012.

Hoekstra, Frank; Search Report from corresponding European Application No. 12169636; Search completed Sep. 24, 2012.

* cited by examiner

SYSTEM AND METHOD FOR DETERMINING A MAGNETIC FIELD USING A MOBILE DEVICE

TECHNICAL FIELD

The following relates to systems and methods for determining a magnetic field using a mobile device.

BACKGROUND

A magnetometer is an instrument used to measure the strength and/or direction of the magnetic field in the vicinity of the instrument. Many electronic devices exist that utilize a magnetometer for taking measurements for a particular application, e.g. geophysical instruments, aerospace equipment, and mobile communications devices such as cellular telephones, PDAs, smart phones, tablet computers, etc., to name a few.

Mobile communication devices, such as those listed above, may only be interested in the Earth's magnetic field. For example, a compass application on a mobile communication device may only be interested in the direction of the Earth's magnetic field.

A mobile communication device typically operates in various different locations and under various circumstances. Changes in the environment in which the mobile communication device operates can affect the operation of the magnetometer. Furthermore, magnetic interference from the environment and/or components of the mobile communication device itself, can cause a magnetometer reading to deviate from the Earth's magnetic field. As such, the magnetometer reading of the mobile communication device may not accurately indicate the Earth's magnetic field.

BRIEF DESCRIPTION OF THE DRAWINGS

Embodiments will now be described by way of example only with reference to the appended drawings wherein.

DETAILED DESCRIPTION OF THE DRAWINGS

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It has been recognized that a magnetometer reading of the Earth's magnetic field may include interference and inaccuracies. To address these interferences and inaccuracies, the following describes a method, computer readable storage medium and mobile device operable to determine a magnetic field.

In one aspect there is provided a method of determining a magnetic field using a mobile device. The method includes determining location information of the mobile device, obtaining magnetic field data based on the location information, determining orientation information of the mobile device and applying the orientation information to the magnetic field data to compute a magnetic field corresponding to the orientation of the mobile device.

In another aspect, there is provided a computer readable storage medium for determining a magnetic field using a mobile device. The computer readable storage medium includes computer executable instructions for determining location information of the mobile device, obtaining magnetic field data based on the location information, determining orientation information of the mobile device and applying the orientation information to the magnetic field data to compute a magnetic field corresponding to the orientation of the mobile device.

In another aspect, there is provided a mobile device including a processor coupled to a memory, a magnetometer and an accelerometer. The memory includes computer executable instructions for determining location information of the mobile device, obtaining magnetic field data based on the location information, determining orientation information of the mobile device and applying the orientation information to the magnetic field data to compute a magnetic field corresponding to the orientation of the mobile device. The mobile device may also include a gyroscope for determining angular movement of the mobile device.

Although the following examples are presented in the context of mobile communication devices, the principles may equally be applied to other devices such as applications running on personal computers, embedded computing devices, other electronic devices, and the like.

For clarity in the discussion below, mobile communication devices are commonly referred to as "mobile devices" for brevity. Examples of applicable mobile devices include without limitation, cellular phones, cellular smart-phones, wireless organizers, pagers, personal digital assistants, computers, laptops, handheld wireless communication devices, wirelessly enabled notebook computers, portable gaming devices, tablet computers, or any other portable electronic device with processing and communication capabilities.

Figure 1:
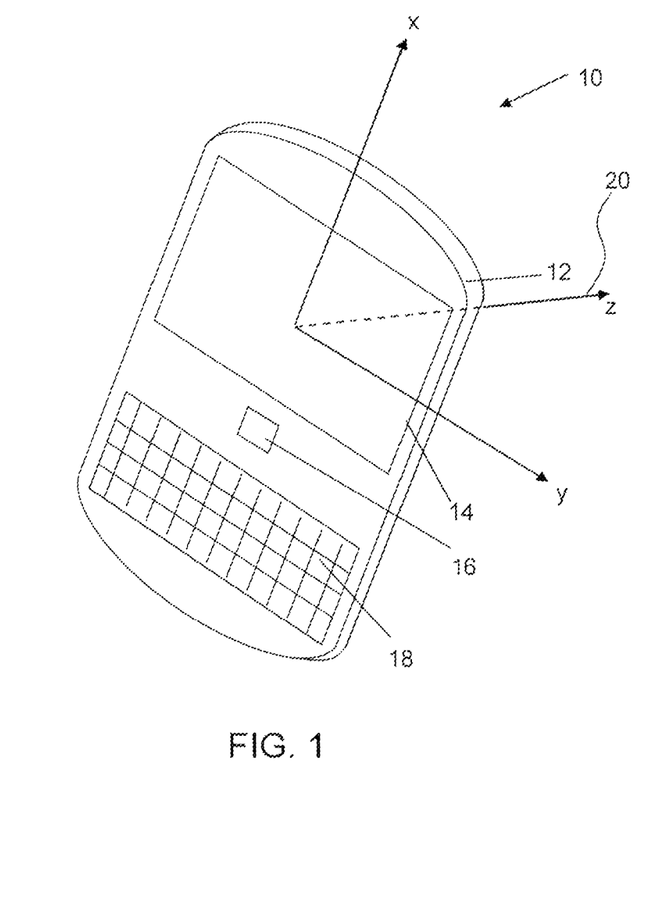
FIG. 1 is a perspective view of an example of a mobile device and its frame of reference.

An exterior view of an example mobile device 10 is shown in FIG. 1. The mobile device 10 in this example comprises a housing 12 which supports a display 14, a positioning device 16 (e.g. track pad, track ball, track wheel, etc.), and a keyboard 18. The keyboard 18 may comprise a full-Qwerty set of keys (as shown) but may also provide a reduced Qwerty set of keys (not shown) in other embodiments.

The mobile device 10 has a frame of reference 20, such as the x, y and z axes of the Cartesian co-ordinate system shown. In this example, the x axis is parallel to the length of the mobile device 10, the y axis is parallel to the width of the mobile device 10 and the z axis is perpendicular to the plane defined by the screen of the display 14 of the mobile device

10. As the mobile device 10 changes orientation, the x, y and z axes remain fixed with respect to the mobile device 10.

Figure 2:
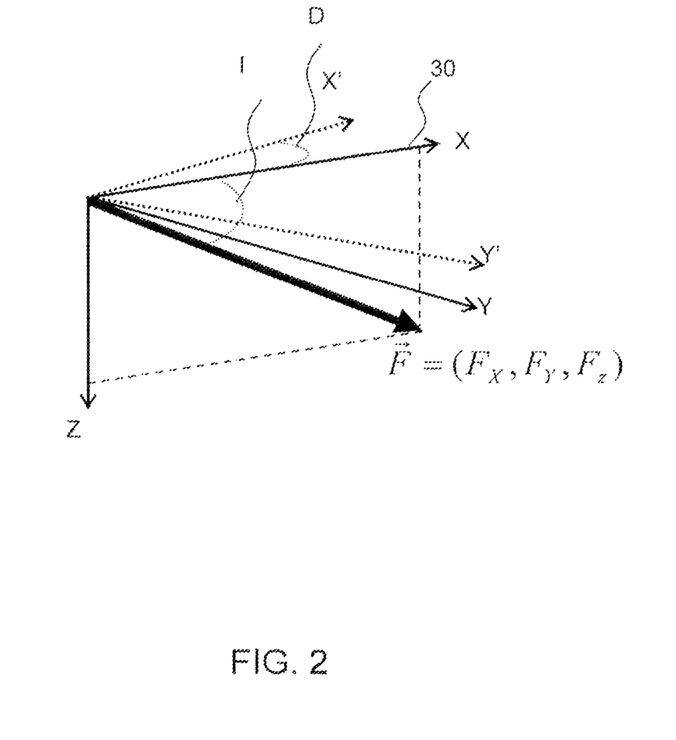
FIG. 2 is a perspective view of an example of Earth's magnetic field in a frame of reference.

An example magnetic field $\vec{F}$ is shown in FIG. 2. The magnetic field $\vec{F}$ can represent the Earth's magnetic field at a specific location on the Earth. The magnetic field $\vec{F}$ is represented by a three-dimensional vector having the co-ordinates $(F_X, F_Y, F_Z)$ within the X, Y and Z axes of another Cartesian co-ordinate system corresponding to the frame of reference 30. In this example, X axis points to magnetic North, Z axis points towards the centre of the Earth and the Y axis is perpendicular to the X and Y axes. The magnetic field $\vec{F}$ has a declination angle D relative to the direction of true North (X' axis) and an inclination angle I relative to the direction of magnetic North (X axis). It will be appreciated that the declination angle D can be used to define the magnetic field $\vec{F}$ by the co-ordinate system of the X', Y' and Z axes corresponding to the directions of true North, East and towards the centre of the Earth.

In one example, the mobile device 10 can determine the Earth's magnetic field $\vec{F}$ at a given location by accessing a model of the Earth's magnetic field, such as the World Magnetic Model (WMM). Location information can be determined using a global positioning system (GPS) or other methods such as location tracking based on proximity of the mobile device 10 to cellular base stations, access information to wireless networks (e.g. WiFi localization), prompting user input for location information, etc. The mobile device 10 can then input such location information (e.g. latitude, longitude, elevation) into the model (e.g. WMM) to obtain the Earth's magnetic field $\vec{F}$ at that location.

It will be appreciated that the model of the Earth's magnetic field $\vec{F}$ can be any suitable model that takes location information as an input, and outputs the Earth's magnetic field $\vec{F}$ or magnetic field data, from which the Earth's magnetic field $\vec{F}$ can be determined. In an example, the model may be a database, indexed by location on the Earth, of pre-computed magnetic field data or measured magnetic field data or a combination thereof. In another example, the model may include a set of mathematical computations that operate on the location information provided by the mobile device 10 to calculate the Earth's magnetic field $\vec{F}$. It will be appreciated that the model may be accessed by the mobile device 10 remotely (e.g. through a wireless network) or locally (e.g. a software application running on the mobile device 10).

The Earth's magnetic field $\vec{F}$ obtained from accessing a model will likely be defined with respect to a frame of reference 30 to the Earth that is different to that of the mobile device 10. For example, the mobile device 10 may define magnetic fields with respect to the frame of reference 20 in FIG. 1 whereas the WMM may define magnetic fields with respect to the frame of reference 30 in FIG. 2. In the examples of FIG. 1 and FIG. 2, the frame of reference 20 of the mobile device 10 will be aligned with the Earth's frame of reference 30 only when the mobile device 10 is oriented parallel to the ground and pointing towards magnetic North such the x, y and z axes of the frame of reference 20 overlap with the X, Y and Z axes of the Earth's frame of reference 30.

Figure 3:
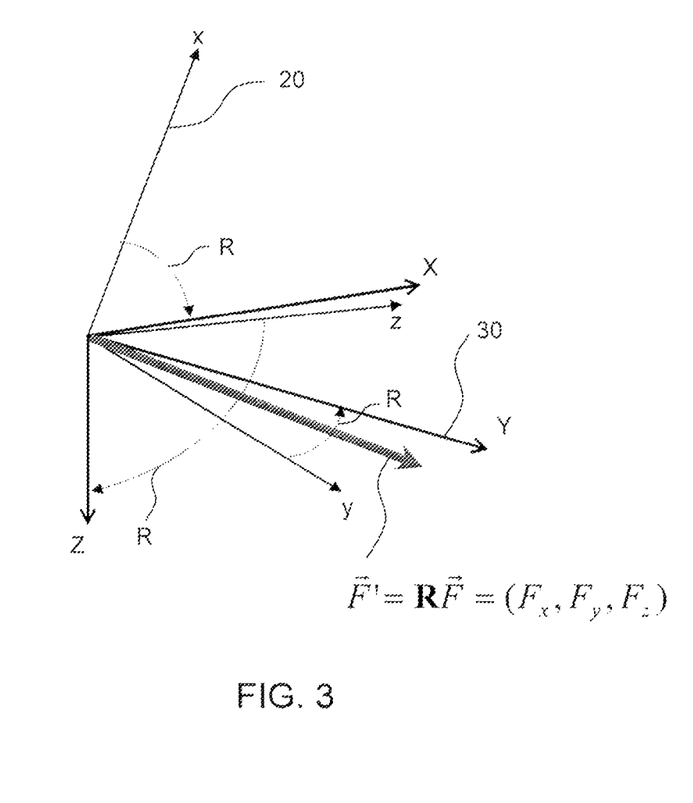
FIG. 3 is a perspective view of an example of Earth's magnetic field in a frame of reference of a mobile device and a frame of reference of the Earth.

Referring to FIG. 3, the frame of reference 20 of the mobile device 10 oriented in FIG. 1 is superimposed onto the frame of reference 30 of the Earth in FIG. 2. The frame of reference 30 can be obtained by rotating the frame of reference 20 by rotation R to rotate axes x, y and z onto X, Y and Z, respectively. The mobile device 10 may then calculate a 3×3 rotation matrix R corresponding to the rotation R. Once the rotation matrix R is determined, it can be applied to rotate the magnetic field $\vec{F}$ (in the Earth's frame of reference 30) to obtain the magnetic field $\vec{F}' = R\vec{F} = (F_x, F_y, F_z)$, defined with respect to the frame of reference 20 of the mobile device 10. The magnetic field $\vec{F}$ rotated on to the frame of reference 20 of the mobile device 10 will be referred herein as the "simulated" magnetic field $\vec{F}'$.

It can therefore be seen that a mobile device can simulate the Earth's magnetic field by applying orientation information of the mobile device 10 to an ideal or predetermined magnetic field $\vec{F}$ defined in the Earth's frame of reference 30. In an example, the mobile device accesses the WMM to obtain a magnetic North-pointing magnetic field vector at the location of the mobile device 10 and rotates that vector from the frame of reference 30 of the WMM to the frame of reference 20 the mobile device 10 using a rotation matrix R. The simulated magnetic field $\vec{F}'$ represents the reading using an ideally calibrated magnetometer of the Earth's magnetic field with no magnetic interference.

As will be discussed below, the rotation matrix R can be generated by "sensor fusion" techniques (i.e. using readings from multiple sensors such as a magnetometer, accelerometer and/or gyroscope). Incorporating multiple sensors can enable the rotation matrix R to provide more accurate and robust orientation information of the mobile device 10. The simulated magnetic field $\vec{F}'$ incorporates these benefits since the rotation matrix R is used to compute the simulated magnetic field $\vec{F}'$. Therefore, the benefit of a high quality rotation matrix R is indirectly passed on to an application that uses or operates on the simulated magnetic field $\vec{F}'$. For example, some mobile device applications primarily rely on raw magnetometer readings to determine rotation and orientation information of the mobile device 10. The mobile device 10 can provide the simulated magnetic field $\vec{F}'$ to the application as the raw magnetometer reading input expected by the application.

Figure 4:
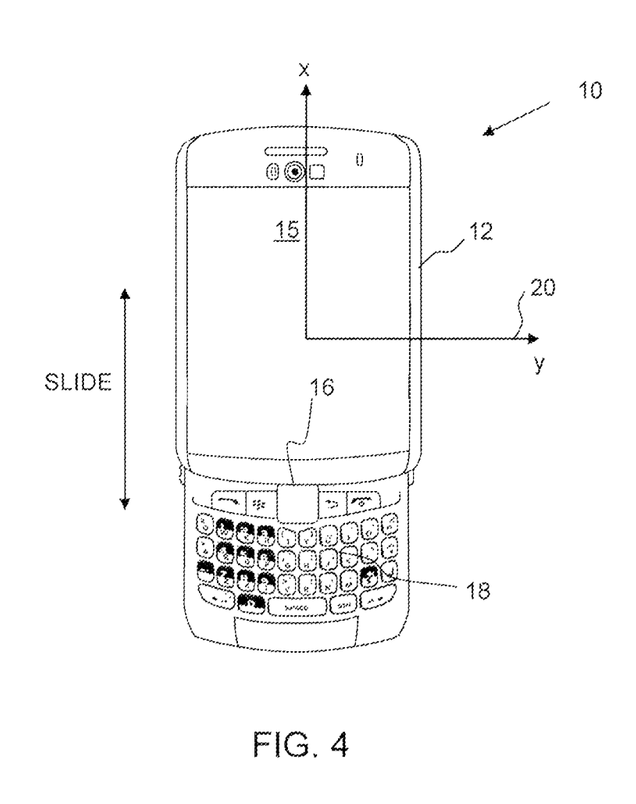
FIG. 4 is a perspective view of an example of a mobile device comprising a slidable keyboard assembly.

It can be appreciated that the mobile device 10 shown in FIG. 1 is provided as an example for illustrative purposes only. FIG. 4 illustrates another mobile device 10, which comprises a touchscreen display 15 and a "slide-out" keyboard 18. In operation, the touchscreen display 15 can be used to interact with applications on the mobile device 10 and the keyboard 18 may be slid out from behind the touchscreen display 15 as shown, when desired, e.g. for typing or composing an email, editing a document, etc. The mobile device 10 has a fixed frame of reference 20 such as the x, y, z axes co-ordinate system (z axis is going into the page and thus not shown).

The mobile device 10 of FIG. 4 illustrates that the mobile device 10 may assume various states depending on the type of device and its various features. The magnetic effects of the mobile device 10 can change or be otherwise influenced by its state. Since changing magnetic influences can affect a magnetometer and its accuracy, different states of the mobile device 10 can contribute to a degradation of the accuracy of the magnetometer.

Figure 5:
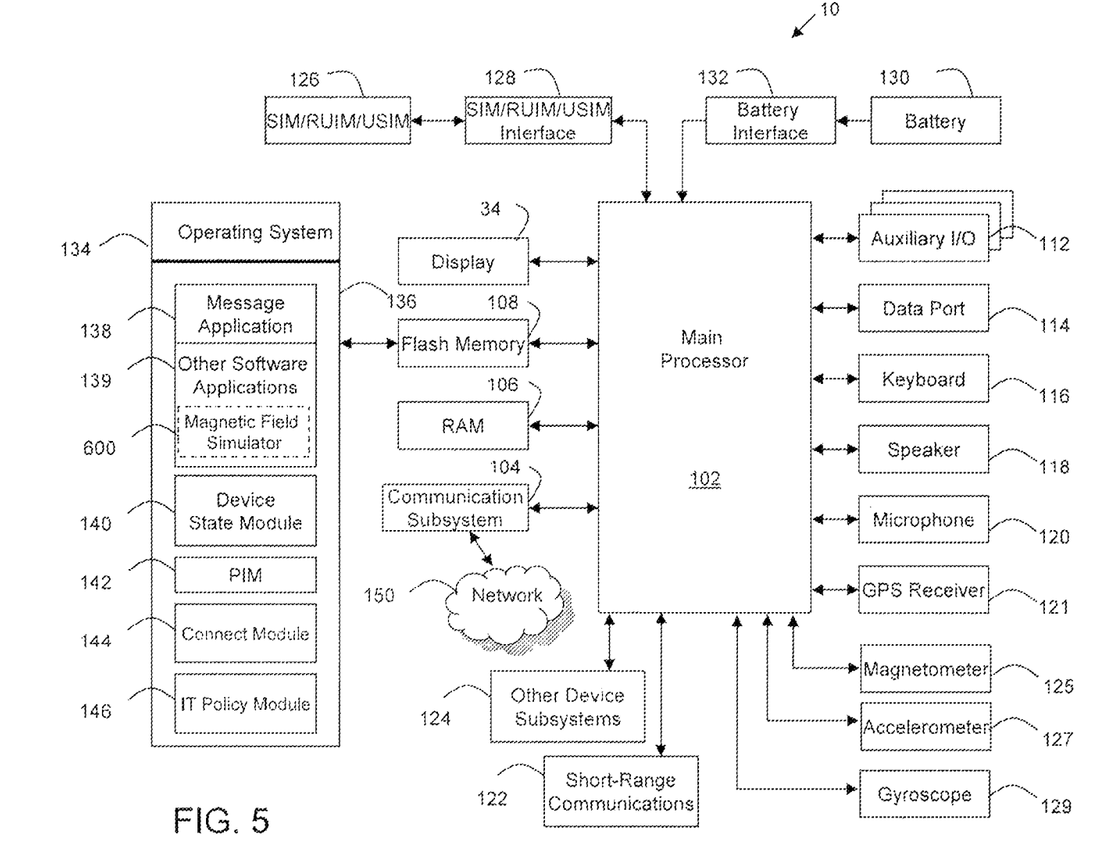
FIG. 5 is a block diagram of an example of a configuration for a mobile device.

Referring now to FIG. 5, shown therein is a block diagram of an example embodiment of a mobile device 10. The mobile device 10 comprises a number of components such as a main processor 102 that controls the overall operation of the mobile device 10. Communication functions, including data and voice communications, are performed through a communication subsystem 104. The communication subsystem 104 receives messages from and sends messages to a wireless network 150. In this example embodiment of the mobile device 10, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 150 represents one or more different Radio Frequency (RF) channels, operating according to defined protocols specified for GSM/GPRS communications. With newer network protocols, these channels are capable of supporting both circuit switched voice communications and packet switched data communications.

The main processor 102 also interacts with additional subsystems such as a Random Access Memory (RAM) 106, a flash memory 108, a display 34, an auxiliary input/output (I/O) subsystem 112, a data port 114, a keyboard 116, a speaker 118, a microphone 120, GPS receiver 121, magnetometer 125, accelerometer 127, gyroscope 129, short-range communications 122, and other device subsystems 124.

Some of the subsystems of the mobile device 10 perform communication-related functions, whereas other subsystems may provide "resident" or on-device functions. By way of example, the display 34 and the keyboard 116 may be used for both communication-related functions, such as entering a text message for transmission over the network 150, and device-resident functions such as a calculator or task list.

The mobile device 10 can send and receive communication signals over the wireless network 150 after required network registration or activation procedures have been completed. Network access is associated with a subscriber or user of the mobile device 10. To identify a subscriber, the mobile device 10 may use a subscriber module. Examples of such subscriber modules include a Subscriber Identity Module (SIM) developed for GSM networks, a Removable User Identity Module (RUIM) developed for CDMA networks and a Universal Subscriber Identity Module (USIM) developed for 3G networks such as UMTS. In the example shown, a SIM/RUIM/USIM 126 is to be inserted into a SIM/RUIM/USIM interface 128 in order to communicate with a network. The SIM/RUIM/USIM component 126 is one type of a conventional "smart card" that can be used to identify a subscriber of the mobile device 10 and to personalize the mobile device 10, among other things. Without the component 126, the mobile device 10 may not be fully operational for communication with the wireless network 150. By inserting the SIM/RUIM/USIM 126 into the SIM/RUIM/USIM interface 128, a subscriber can access all subscribed services. Services may include: web browsing and messaging such as e-mail, voice mail, SMS, and MMS. More advanced services may include: point of sale, field service and sales force automation. The SIM/RUIM/USIM 126 includes a processor and memory for storing information. Once the SIM/RUIM/USIM 126 is inserted into the SIM/RUIM/USIM interface 128, it is coupled to the main processor 102. In order to identify the subscriber, the SIM/RUIM/USIM 126 can include some user parameters such as an International Mobile Subscriber Identity (IMSI). An advantage of using the SIM/RUIM/USIM 126 is that a subscriber is not necessarily bound by any single physical mobile device. The SIM/RUIM/USIM 126 may store additional subscriber information for a mobile device as well, including datebook (or calendar) information and recent call information. Alternatively, user identification information can also be programmed into the flash memory 108.

The mobile device 10 is typically a battery-powered device and may include a battery interface 132 for receiving one or more batteries 130 (typically rechargeable). In at least some embodiments, the battery 130 can be a smart battery with an embedded microprocessor. The battery interface 132 is coupled to a regulator (not shown), which assists the battery 130 in providing power to the mobile device 10. Although current technology makes use of a battery, future technologies such as micro fuel cells may provide the power to the mobile device 10.

The mobile device 10 also includes an operating system (OS) 134 and software components 136 to 146. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Other software applications include a message application 138 that can be any suitable software program that allows a user of the mobile device 10 to send and receive electronic messages. Various alternatives exist for the message application 138 as is well known to those skilled in the art. Messages that have been sent or received by the user are typically stored in the flash memory 108 of the mobile device 10 or some other suitable storage element in the mobile device 10. In at least some embodiments, some of the sent and received messages may be stored remotely from the mobile device 10 such as in a data store of an associated host system that the mobile device 10 communicates with.

The software applications can further comprise a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 10 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 150. PIM data items may be seamlessly integrated, synchronized, and updated via the wireless network 150 with the mobile device subscriber's corresponding data items stored and/or associated with a host computer system. This functionality creates a mirrored host computer on the mobile device 10 with respect to such items. This can be particularly advantageous when the host computer system is the mobile device subscriber's office computer system.

The mobile device 10 may also comprise a connect module 144, and an IT policy module 146. The connect module 144 implements the communication protocols that are required for the mobile device 10 to communicate with the wireless infrastructure and any host system, such as an enterprise system, that the mobile device 10 is authorized to interface with.

The connect module 144 includes a set of APIs that can be integrated with the mobile device 10 to allow the mobile device 10 to use any number of services associated with the enterprise system. The connect module 144 allows the mobile device 10 to establish an end-to-end secure, authenticated communication pipe with a host system (not shown). A subset of applications for which access is provided by the connect module 144 can be used to pass IT policy commands from the host system to the mobile device 10. This can be done in a wireless or wired manner. These instructions can then be passed to the IT policy module 146 to modify the configuration of the device 10. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 10. Applications for which the IT policy may be applicable then respond by reading the IT policy data to look for IT policy rules that are applicable.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc.

The additional applications 139 can be loaded onto the mobile device 10 through at least one of the wireless network 150, the auxiliary I/O subsystem 112, the data port 114, the short-range communications subsystem 122, or any other suitable device subsystem 124. This flexibility in application installation increases the functionality of the mobile device 10 and may provide enhanced on-device functions, communication-related functions, or both. For example, secure communication applications may enable electronic commerce functions and other such financial transactions to be performed using the mobile device 10.

The data port 114 enables a subscriber to set preferences through an external device or software application and extends the capabilities of the mobile device 10 by providing for information or software downloads to the mobile device 10 other than through a wireless communication network. The alternate download path may, for example, be used to load an encryption key onto the mobile device 10 through a direct and thus reliable and trusted connection to provide secure device communication.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

The short-range communications subsystem 122 provides for communication between the mobile device 10 and different systems or devices, without the use of the wireless network 150. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 104 and input to the main processor 102. The main processor 102 may then process the received signal for output to the display 34 or alternatively to the auxiliary I/O subsystem 112. A subscriber may also compose data items, such as e-mail messages, for example, using the keyboard 116 in conjunction with the display 34 and possibly the auxiliary I/O subsystem 112. The auxiliary subsystem 112 may comprise devices such as: a touch screen, mouse, track ball, infrared fingerprint detector, or a roller wheel with dynamic button pressing capability. The keyboard 116 is an alphanumeric keyboard and/or telephone-type keypad. However, other types of keyboards may also be used. A composed item may be transmitted over the wireless network 150 through the communication subsystem 104.

For voice communications, the overall operation of the mobile device 10 in this example is substantially similar, except that the received signals are output to the speaker 118, and signals for transmission are generated by the microphone 120. Alternative voice or audio I/O subsystems, such as a voice message recording subsystem, can also be implemented on the mobile device 10. Although voice or audio signal output is accomplished primarily through the speaker 118, the display 34 can also be used to provide additional information such as the identity of a calling party, duration of a voice call, or other voice call related information.

Figure 6:
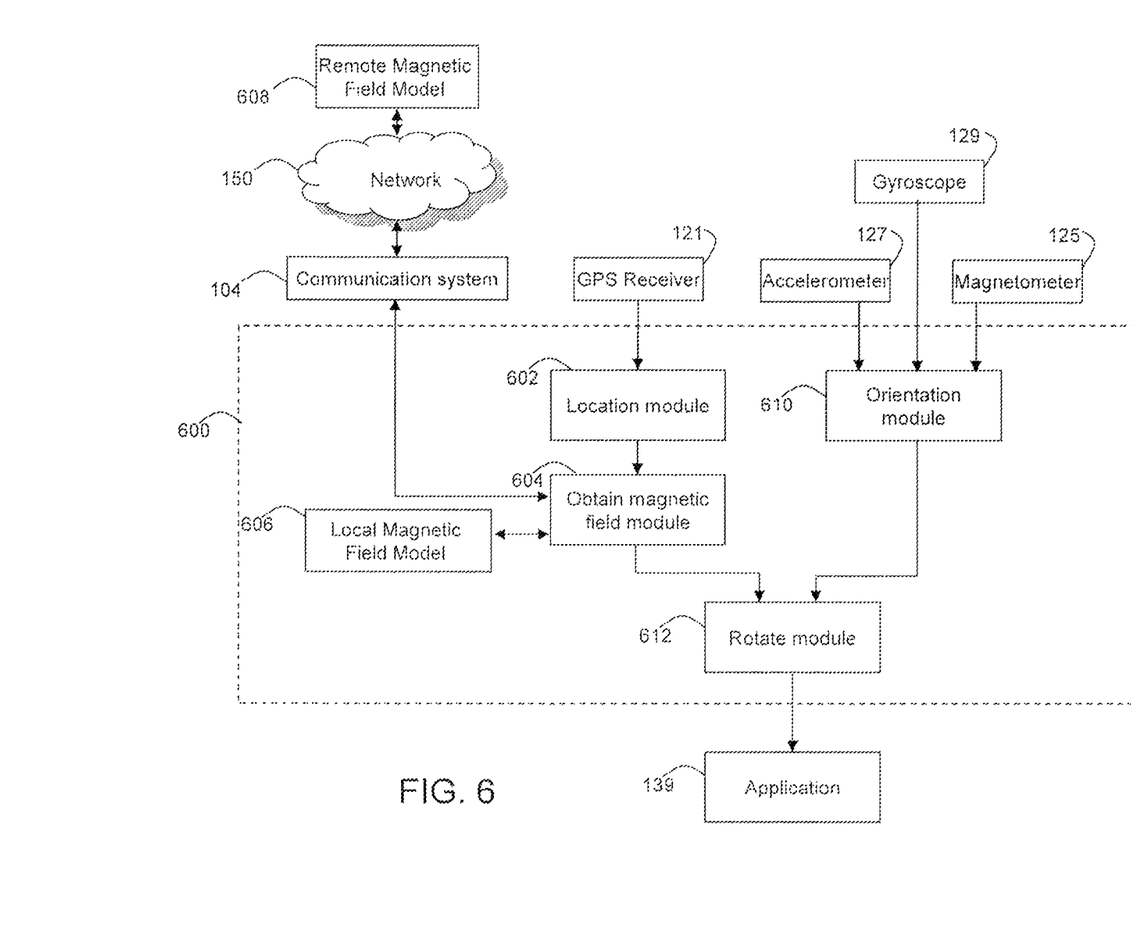
FIG. 6 is a block diagram of an example of a configuration for a mobile device comprising a magnetic field simulator.

Referring to FIG. 6, an example of a configuration for a magnetic field simulator 600 is provided. The magnetic field simulator 600 can be one of the other software applications 139 of FIG. 5 that can be loaded on the mobile device 10. The magnetic field simulator 600 can request details of activity occurring in, or receive inputs from, a magnetometer 125, an accelerometer 127, a gyroscope 129 and a GPS receiver 121. In the example of FIG. 6, the magnetic field simulator 600 can also receive magnetic field data from a remote magnetic field model, such as the WMM 608, via a communication subsystem 104 connected to a network 150 (e.g. the internet). The magnetic field simulator 600 can send a simulated magnetic field $\vec{F}'$ to an application 139 that expects a magnetic field from a raw magnetometer reading.

The magnetic field simulator 600 in the example of FIG. 6 includes a location module 602 for determining location information of the mobile device 10 and an obtain magnetic field module 604 for obtaining magnetic field data. The magnetic field simulator 600 also includes an orientation module 610 for determining the orientation of the mobile device 10 with respect to the Earth's frame of reference 30 and a rotate module 612 for rotating the magnetic field data obtained from the obtain magnetic field module 604 into the frame of reference 20 of the mobile device 10. The rotate module 612 outputs a simulated magnetic field $\vec{F}'$ in the frame of reference 20 of the mobile device 10.

The location module 602 receives location information from the GPS receiver 121 of the mobile device 10. The location information may comprise of longitude and latitude coordinates. Elevation may also be determined or approximated. It can be appreciated that the location module 602 can determine location information from other subsystems or components using methods other than GPS tracking.

The obtain magnetic field module 604 receives location information of the mobile device 10 and uses such information to access a magnetic field model to obtain magnetic field data. The magnetic field data can be obtained from a remote magnetic field model 608 or a local magnetic field model 606. For example, the remote magnetic field model 608 may be an online calculator of the Earth's magnetic field $\vec{F}$. In another example, the local magnetic field mode 606 may be a software application 139 that performs calculations on the location information to generate magnetic field data.

The orientation module 610 receives sensor data from one or more sensors, such as the accelerometer 127, magnetometer 125 and gyroscope 129, to determine the orientation of the mobile device 10 with respect to Earth's frame of reference 30 and to determine the rotation matrix R to rotate a vector in the Earth's frame of reference 30 onto the frame of reference 20 of the mobile device 10.

In one example, the orientation can be determined from using readings from the accelerometer 127 and magnetometer 125. However, a magnetometer 125 may be subject to magnetic interference and an accelerometer 127 may be affected by linear acceleration of the mobile device 10, thus affecting the quality of the orientation that is determined. In another example, the orientation can be determined by using the accelerometer 127, magnetometer 125 and gyroscope 129. Use of all three sensors may provide a more accurate orientation and rotation matrix R that is less susceptible to interference.

The rotation module 612 receives the magnetic field $\vec{F}$ obtained from the obtain magnetic field module 604 and receives the rotation matrix R from the orientation module 610. The rotation module 612 applies the rotation matrix R to rotate the magnetic field $\vec{F}$ onto the frame of reference 20 of the mobile device 10 to generate the simulated magnetic field $\vec{F}'$. The simulated magnetic field $\vec{F}'$ is provided to an application 139 requiring a magnetic field input.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10 (or other computing or communication device that utilizes similar principles) or accessible or connectable thereto. Any application or module herein described, such as the location module 602, obtain magnetic field module 604, orientation module 610, rotate module 612 and local magnetic field model 606, may be implemented using computer readable/executable instructions that may be stored or otherwise held by such computer readable media.

Figure 7:
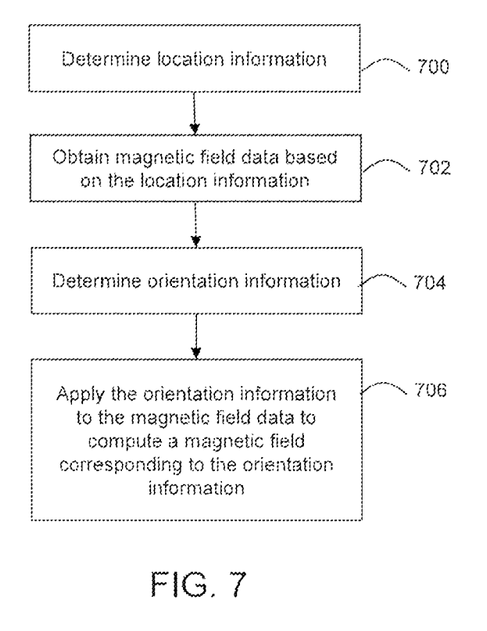
FIG. 7 is a flow chart including an example of a set of computer executable operations for determining a magnetic field using a mobile device.

Referring to FIG. 7, an example set of computer executable instructions is provided for determining a magnetic field using a mobile device 10. At 700, location information of the mobile device 10 is determined. At 702, magnetic field data is obtained based on the location information of the mobile device 10. At 704, orientation information of the mobile device 10 with respect to the Earth's frame of reference 30 is determined. At 706, the orientation information is applied to the magnetic field data to compute a magnetic field that corresponds to the orientation of the mobile device 10.

As noted above, at 700, location information of the mobile device 10 is determined. In an example configuration of the magnetic field simulator 600, the location module 602 may implement 700 by receiving location information (e.g. latitude, longitude, elevation) from the GPS receiver 121 of the mobile device 10 (FIG. 6). It can be appreciated that location information of the mobile device 10 can be obtained using other methods such as location tracking based on proximity of the mobile device 10 to cellular base stations, access information to wireless networks (e.g. WiFi localization), cache of location history, prompting by the mobile device 10 for the user to input the current location, etc.

At 702, magnetic field data is obtained based on the location information of the mobile device 10. In an example configuration of the magnetic field simulator 600, the obtain magnetic field module 604 may implement 702 (FIG. 6). In one example, the location information may be used to access a model of the Earth's magnetic field $\vec{F}$, such as the WMM or another model. Information regarding the location of the mobile device 10, such as latitude, longitude and elevation, along with additional information such as the date, can be input to the model to obtain information on the Earth's magnetic field $\vec{F}$ at that specific location. The magnetic field data may include a combination of the following information: magnitude $|\vec{F}|$, horizontal intensity $F_X$, vertical component $F_Z$, inclination angle I and declination angle D (FIG. 2). It can be appreciated that the model of magnetic field data may be accessed remotely by the mobile device 10, such as through a wireless network 150, or may be stored locally on the mobile device 10.

At 704, orientation information of the mobile device 10 with respect to the Earth's frame of reference 30 is determined. In an example configuration of the magnetic field simulator 600, the orientation module 610 may implement 704 (FIG. 6). Referring back to FIG. 3, the x, y and z axes represent the frame of reference 20 of the mobile device 10 and the X, Y and Z axes represent the Earth's frame of reference 30. In one embodiment, the mobile device 10 can use an accelerometer 127 to determine the direction of the Z axis. When the mobile device 10 is stationary, the accelerometer 127 will measure a vector with the magnitude of 1 g in a direction corresponding to the −Z axis. Thus, the opposite direction of the accelerometer vector will correspond to the direction of the Z axis. The mobile device 10 can use a magnetometer 125 to measure the Earth's magnetic field lying on the XZ plane. The mobile device 10 can compute the cross-product of the accelerometer vector and the magnetometer vector to generate a vector in the direction of the Y-axis. The mobile device 10 can then compute the cross-product of the vector in the direction of the Y-axis and the accelerometer vector to generate a vector in the direction of the X-axis. Therefore it can be seen that the mobile device 10 can determine the direction of the X, Y and Z axes in the frame of reference 20 of the mobile device 10. The mobile device 10 can then calculate the rotation matrix R corresponding to the rotation R that rotates the axes x, y and z onto X, Y and Z, respectively. It will be appreciated that the rotation matrix R can be calculated using various 'methods known by a person skilled in the art, such as by using the Euler angles corresponding to the rotation R or any other suitable method. In one example, unit column vectors defined in the reference frame 20 in the direction of the X, Y and Z axes can be used as the left, middle and right columns of the rotation matrix R, respectively. In another example, unit row vectors of the X, Y and Z axes can be used as the top, middle and bottom rows of the rotation matrix R. It will be appreciated that the mapping of the X, Y and Z axes onto the rows or columns of the rotation matrix R can depend on the frame of reference 20 or 30 used to define the vector to be rotated and the resulting rotated vector.

In another embodiment, the mobile device 10 can incorporate gyroscope readings from the gyroscope 129 of the mobile device 10 to compute the rotation matrix R. In one example, the mobile device 10 can update a previously computed rotation matrix R based on the angular movement of the mobile device 10 that has occurred since the previous rotation matrix R was computed, as detected by the gyroscope 129. This may be desirable if the mobile device 10 is experiencing linear acceleration such that the accelerometer reading is not aligned perfectly with the Z axis of the Earth's frame of reference 30 and/or there is magnetic interference near the mobile device 10 such that the magnetometer reading does not consist only of the Earth's magnetic field. During such times, the accelerometer readings and/or magnetometer readings may be ignored and the gyroscope readings can be used to update a previous reliable rotation matrix R. For example, a magnetometer 125 may need to access the Z axis of the Earth's frame of reference 30. The magnetometer can use the rotation matrix R to determine the Z axis (e.g. as the right most column of the rotation matrix R or by rotating a previously reliable accelerometer vector with the rotation matrix R) instead of using the current accelerometer vector at times when the accelerometer is determined not to be reliable.

Furthermore, the gyroscope 129 may be able to detect movements of the mobile device 10 more quickly to enable the rotation matrix R to be updated before additional magnetometer and/or accelerometer readings are available. It can be appreciated that a gyroscope 129 can be used in other ways to improve the accuracy of the rotation matrix R and to improve the robustness of the rotation matrix R against interferences that other sensors may be susceptible to, such as linear accelerations of the mobile device 10 and/or magnetic interference in the proximity of the mobile device 10.

Referring back to FIG. 7, at 706, the orientation information of the mobile device 10 is applied to the magnetic field data to compute a simulated magnetic field $\vec{F}$ that corresponds to the orientation of the mobile device 10. In an example configuration of the magnetic field simulator 600, the rotate module 612 may implement 706 (FIG. 6). In one embodiment, the magnetic field data can include the Earth's magnetic field $\vec{F}=(F_X, F_Y, F_Z)$ at the location of the mobile device 10 or it can be derived from the magnetic field data. The simulated magnetic field $\vec{F}'$ can be computed as $\vec{F}'=R \vec{F}=(F_x, F_y, F_z)$ (ie. rotating the $\vec{F}$ by the rotation matrix R).

The simulated magnetic field $\vec{F}'$ may be provided to an application 139 on the mobile device 10. Some applications 139 may only take magnetometer readings (ie. magnetic field vectors) as input because the application was developed for a platform that did not support rotation matrix inputs or because the application 139 was developed to operate on raw magnetometer readings. In an embodiment, the mobile device 10 provides the simulated magnetic field $\vec{F}'$ as the magnetometer reading input to such applications 139. Since the simulated magnetic field $\vec{F}'$ is computed using the rotation matrix R, the benefits of the rotation matrix R are indirectly passed on to the application 139, even if it does not use the rotation matrix R as input.

Furthermore, it will be appreciated that any future improvements to the rotation matrix R will automatically be passed on to the application 139 because the simulated magnetic field $\vec{F}'$ is computed using the rotation matrix R.

In another embodiment, a combination of the simulated magnetic field and a magnetometer reading may be passed to the application 139 as the magnetometer reading input. For example, a magnetic field in the direction of $\vec{F}'$ and having the magnitude of a magnetometer reading may be passed on as the input to an application 139. Use of the magnitude of the magnetometer reading can indicate the local magnetic field interference, which may be useful for non-navigation applications. Use of the direction of $\vec{F}'$ may be useful for navigation applications which may be interested in the direction of magnetic North, but not necessarily the magnitude of the magnetic field.

In another embodiment, the simulated magnetic field $\vec{F}'$, or a portion thereof, may be subtracted or removed from a magnetometer reading to isolate magnetic interference in the magnetometer reading. For example, many applications are interested in magnetic interference, opposed to the Earth's magnetic field, such as a stud finder application, metal detector application and other applications 139 that may be available on the mobile device 10. It will be appreciated that the magnetometer reading may also be calibrated before or after removing the simulated magnetic field using other magnetometer calibration techniques for addressing errors such as constant bias, gain and inter-axis misalignment.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above principles have been described with reference to certain specific embodiments, various modifications thereof will be apparent to those skilled in the art as outlined in the appended claims.

The invention claimed is:

1. A method of determining a magnetic field using a mobile device, the method comprising:
  determining location information of the mobile device;
  obtaining magnetic field data from a model of Earth's magnetic field based on the location information and without sensing a magnetic field at the device, the magnetic field data representing Earth's magnetic field at the location of the mobile device;
  determining, contemporaneous with the determining of the location information, orientation information of the mobile device at the location;
  applying the orientation information to the obtained magnetic field data representing the Earth's magnetic field to compute a simulated Earth's magnetic field in the orientation of the mobile device, the simulated Earth's magnetic field being separate from any magnetic field data output from a magnetometer at the mobile device; and outputting the simulated Earth's magnetic field.

2. The method of claim 1, wherein the orientation information comprises angular position information of the mobile device.

3. The method of claim 1, wherein applying the orientation information comprises rotating the magnetic field data using a rotation matrix.

4. The method of claim 1, wherein the model of Earth's magnetic field comprises a predetermined set of magnetic field data arranged according to location.

5. The method of claim 4, wherein the predetermined set of magnetic field data is located remote from the mobile device.

6. The method of claim 1, wherein the model of Earth's magnetic field comprises a predetermined set of computations using the location information.

7. The method of claim 1, further comprising adjusting the magnitude of the simulated Earth's magnetic field based on a magnetometer reading.

8. The method of claim 1, further comprising using the simulated Earth's magnetic field as input to an application that was developed to use one or more magnetometer readings as input.

9. The method of claim 1, further comprising removing at least a portion of the magnetic field from a magnetometer reading to detect magnetic interference.

10. A computer readable storage medium for determining a magnetic field using a mobile device, the computer readable storage medium comprising computer executable instructions which, responsive to being executed by a processor, cause the processor perform operations comprising:

determining location information of the mobile device;

obtaining magnetic field data from a model of Earth's magnetic field based on the location information and without sensing a magnetic field at the device, the magnetic field data representing Earth's magnetic field at the location of the mobile device;

determining, contemporaneous with the determining of the location information, orientation information of the mobile device at the location;

applying the orientation information to the obtained magnetic field data representing the Earth's magnetic field to compute a simulated Earth's magnetic field in the orientation of the mobile device, the simulated Earth's magnetic field being separate from any magnetic field data output from a magnetometer at the mobile device; and outputting the simulated Earth's magnetic field.

11. The computer readable storage medium of claim 10, wherein the orientation information comprises angular position information of the mobile device.

12. The computer readable storage medium of claim 10, wherein applying the orientation information comprises rotating the magnetic field data representing the Earth's magnetic field using a rotation matrix.

13. The computer readable storage medium of claim 10 further comprising computer executable instructions for using the simulated Earth's magnetic field as input to an application that was developed to use one or more magnetometer readings as input.

14. The computer readable storage medium of claim 10 further comprising computer executable instructions for removing at least a portion of the magnetic field from a magnetometer reading to detect magnetic interference.

15. A mobile device comprising a processor coupled to a memory, a magnetometer and an accelerometer, the memory comprising computer executable instructions for:

determining location information of the mobile device;

obtaining magnetic field data from a model of Earth's magnetic field based on the location information and without sensing a magnetic field at the device, the magnetic field data representing Earth's magnetic field at the location of the mobile device;

determining, contemporaneous with the determining of the location information, orientation information of the mobile device at the location;

applying the orientation information to the obtained magnetic field data representing the Earth's magnetic field to compute a simulated Earth's magnetic field in the orientation of the mobile device, the simulated Earth's magnetic field being separate from any magnetic field data output from a magnetometer at the mobile device; and outputting the simulated Earth's magnetic field.

16. The mobile device of claim 15 further comprising a gyroscope for determining angular movement of the mobile device.

17. The mobile device of claim 15, wherein the orientation information comprises angular position information of the mobile device.

18. The mobile device of claim 15, wherein applying the orientation information comprises rotating the magnetic field data using a rotation matrix.

19. The mobile device of claim 15, wherein the memory further comprises computer executable instructions for using the magnetic field as input to an application that was developed to use one or more magnetometer readings as input.

20. The mobile device of claim 15, wherein the memory further comprises computer executable instructions for removing at least a portion of the magnetic field from a magnetometer reading to detect magnetic interference.

* * * * *